(12) United States Patent
Goodjohn

(10) Patent No.: US 7,164,473 B2
(45) Date of Patent: Jan. 16, 2007

(54) METHOD AND APPARATUS FOR MEASURING FACE ANGLE

(75) Inventor: Andrew J. Goodjohn, Vista, CA (US)

(73) Assignee: Callaway Golf Company, Carlsbad, CA (US)

( * ) Notice: Subject to any disclaimer, the term of this patent is extended or adjusted under 35 U.S.C. 154(b) by 405 days.

(21) Appl. No.: 10/708,683

(22) Filed: Mar. 18, 2004

(65) Prior Publication Data
US 2005/0206882 A1   Sep. 22, 2005

(51) Int. Cl.
*G01B 11/26* (2006.01)
*G01B 1/00* (2006.01)

(52) U.S. Cl. .............................. 356/139.04; 356/141.2; 33/508; 473/282; 473/409; 73/65.03

(58) Field of Classification Search ........... 356/139.04, 356/141.2; 33/508, 549, 534, 535, 551–554, 33/573; 473/409, 282, 287, 290; 73/65.03
See application file for complete search history.

(56) References Cited

U.S. PATENT DOCUMENTS

| | | | |
|---|---|---|---|
| 2,546,426 A | 3/1951 | Bryant | |
| 3,822,477 A | 7/1974 | Collins | |
| 4,094,072 A | 6/1978 | Erb | |
| 4,245,392 A | 1/1981 | Heller | |
| 4,620,431 A | 11/1986 | Muldoon | |
| 4,622,836 A | 11/1986 | Long et al. | |
| 4,875,293 A | 10/1989 | Wakefield | |
| 5,105,550 A | 4/1992 | Shenoha | |
| 5,421,098 A | 6/1995 | Muldoon | |
| 5,527,034 A | 6/1996 | Ashcroft et al. | |
| 5,596,812 A | 1/1997 | Solheim | |
| 5,884,409 A | 3/1999 | Muldoon | |
| 6,095,928 A * | 8/2000 | Goszyk | 473/222 |
| 6,363,620 B1 | 4/2002 | Goodjohn | |
| 6,430,829 B1 * | 8/2002 | Williamson et al. | 33/508 |
| 6,602,147 B1 * | 8/2003 | Shiraishi | 473/291 |
| 6,871,414 B1 * | 3/2005 | Burney et al. | 33/508 |

* cited by examiner

*Primary Examiner*—Layla G. Lauchman
(74) *Attorney, Agent, or Firm*—Michael A. Catania; Elaine H. Lo

(57) ABSTRACT

A method (250) and apparatus (20) for measuring the face angle of a golf club (300), golf club head (302) or face component (304) of a golf club head is disclosed herein. The method (250) and apparatus (20) use a non-contact displacement measuring assembly (24) to determine the face angle. The method (250) and apparatus (20) is utilized with right-handed and left handed golf clubs (300), golf club heads (302) and face components (304). The apparatus (20) generally includes a base assembly (22), a non-contact displacement measuring assembly (24), a shaft center sensor assembly (26), a base plate assembly (28), a lie adjustment assembly (30) and a shaft support assembly (32).

2 Claims, 9 Drawing Sheets

METHOD AND APPARATUS FOR MEASURING FACE ANGLE

FEDERAL RESEARCH STATEMENT

[Not Applicable]

BACKGROUND OF INVENTION

1. Field of the Invention

The present invention relates to a method and apparatus for measuring the face angle of a golf club, golf club head or golf club head face component.

2. Description of the Related Art

Face angle is roughly defined as a static measurement of how open or closed a club face is relative to a target line. This is usually determined by the sole design and the angular relationship between the shaft and the club head, which is called the bore angle. Measurement of the face angle of a golf club or golf club head is difficult, and prone to operator error.

One device currently used to measure face angle is a M-300 device. An operator will place a golf club in the device and attempt to determine the "keel point" of the club head. The keel point is a contact point of the sole with a predetermined line on the ground. Operator error in using the M-300 can cause the measurement to be completely inaccurate. Thus, the industry requires a more objective method and apparatus to measure face angle.

SUMMARY OF INVENTION

The present invention provides an objective method and apparatus for measuring the face angle of a golf club, golf club head or face component of the golf club head. The present invention allows for the center of gravity equilibrium point of a golf club to be simulated in order to find the face angle of the golf club, golf club head or face component of the golf club head.

One aspect of the present invention is an apparatus for measuring the face angle of a golf club, a golf club head or a face component. The apparatus comprises a base, a base plate assembly, a non-contact displacement measuring assembly, a lie adjustment assembly, a shaft support assembly, a shaft center sensor assembly and an operator interface terminal. The base plate assembly is positioned on the base and is capable of X-Y movement relative to the base. The non-contact displacement measuring assembly comprises a face center locating device, a plurality of non-contact displacement measuring devices, a vertical movement device and a horizontal movement device. The non-contact displacement measuring assembly is positioned on the base forward of the base plate assembly. The lie adjustment assembly is positioned on the base rearward of the base plate assembly. The lie adjustment assembly comprises a lie scale plate, an arm and a guide support plate. The shaft support assembly is attached to the guide support plate of the lie adjustment assembly. The shaft support assembly comprises a shaft support arm and a shaft support device with an aperture. The shaft center sensor assembly is attached to the arm of the lie adjustment assembly above the base plate assembly. The operator interface terminal is positioned on the base.

Another aspect of the present invention is a method for measuring the face angle of a golf club, a golf club head or a face component. The method commences with orienting the golf club, the golf club head or the face component on a base plate of an apparatus. Next, a face center locating device is aligned with a center point of a face of the golf club, golf club head or the face component. Next, the face angle golf club, golf club head or face component is determined by measuring the distance of a plurality of non-contact displacement measuring devices, at least two of the plurality of non-contact displacement measuring devices positioned on opposite sides of the face center locating device.

Another aspect of the present invention is a method for measuring the face angle of a golf club. The method commences with placing a golf club head of the golf club on a tacky surface of a base plate of an apparatus. Next, a shaft of the golf club is placed in a shaft support assembly. Next, the shaft is aligned with a lie angle of a golf club on a lie scale plate of the apparatus. Next, the shaft of the golf club is centered within a shaft center censor assembly of the apparatus. Next, a face center locating device is aligned with a center point of a face of the golf club. Next, the face angle of the golf club is determined by measuring the distance of a plurality of non-contact displacement measuring devices, at least two of the plurality of non-contact displacement measuring devices positioned on opposite sides of the face center locating device.

Yet another aspect of the present invention is a method for measuring the face angle of a golf club head. The method commences with attaching a mandrel to the golf club head. The mandrel simulates a shaft for the golf club head. Next, the golf club head is placed on a smooth surface of a base plate of an apparatus. Next, the mandrel attached to the golf club is placed in a shaft support assembly. Next, the mandrel is aligned with a lie angle for the golf club head on a lie scale plate of the apparatus. Next, the mandrel attached to the golf club head is centered within a shaft center censor assembly of the apparatus. Next, a face center locating device is aligned with a center point of a face of the golf club head. Next, the face angle of the golf club head is determined by measuring the distance of a plurality of non-contact displacement measuring devices, at least two of the plurality of noncontact displacement measuring devices positioned on opposite sides of the face center locating device.

Yet another aspect of the present invention is a method for measuring the face angle of a face component of a golf club head. The method commences with attaching a mandrel to face component. The mandrel simulates a shaft for the golf club head. Next, the face component is placed on a smooth surface of a base plate of an apparatus. Next, the mandrel attached to the face component is placed in a shaft support assembly. Next, the mandrel is aligned with a lie angle for the golf club head on a lie scale plate of the apparatus. Next, the mandrel attached to the face component is centered within a shaft center censor assembly of the apparatus. Next, a face center locating device is aligned with a center point of a face of the golf club head. Next, the face angle of the face component is determined by measuring the distance of a plurality of non-contact displacement measuring devices, at least two of the plurality of non-contact displacement measuring devices positioned on opposite sides of the face center locating device.

Having briefly described the present invention, the above and further objects, features and advantages thereof will be recognized by those skilled in the pertinent art from the following detailed description of the invention when taken in conjunction with the accompanying drawings.

DETAILED DESCRIPTION

Figure 1:
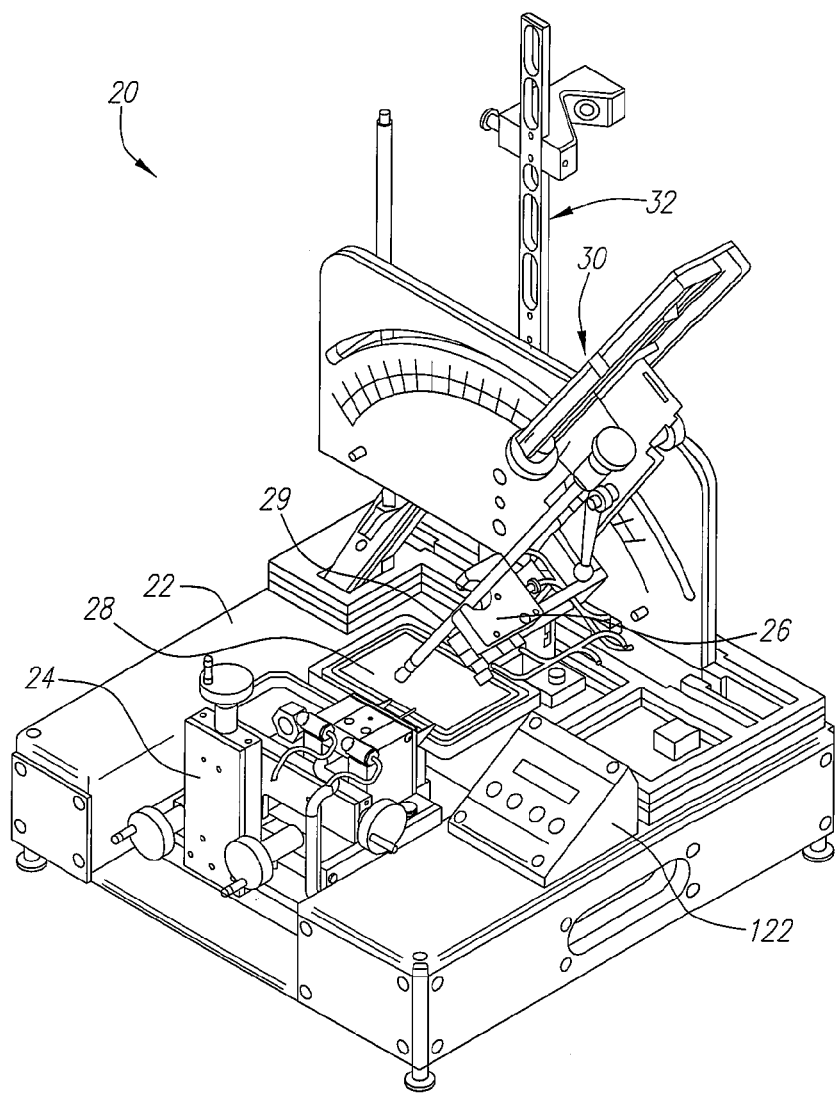
FIG. 1 is a top perspective of an apparatus for measuring the face angle of a golf club, golf club head or face component.

As shown in FIG. 1, an apparatus for measuring the face angle of a golf club, a golf club head or a face component of a golf club head is designated 20. The apparatus 20 generally comprises a base assembly 22, a non-contact displacement measuring assembly 24, a shaft center sensor assembly 26, a base plate assembly 28, a lie adjustment assembly 30 and a shaft support assembly 32.

Figure 2:
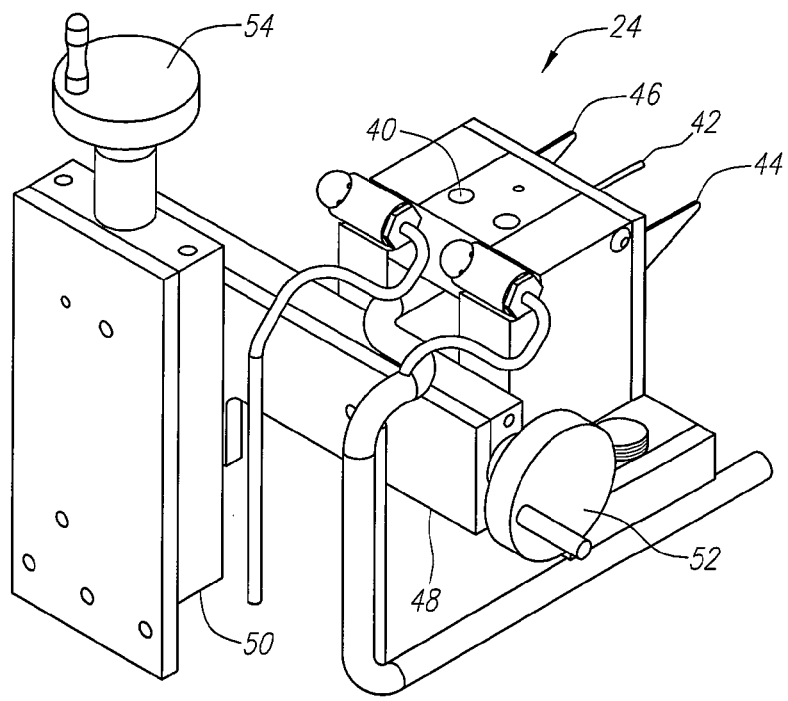
FIG. 2 is an isolated perspective view of the laser assembly of the apparatus of FIG. 1.

As shown in FIG. 2, the non-contact displacement measuring assembly 24 generally comprises a housing 40, a face center locating device 42, a plurality of non-contact displacement measuring devices 44 and 46, a horizontal movement device 48 and a vertical movement device 50. A preferred face center locating device 42 is a primary laser 42 and a preferred plurality of non-contact displacement measuring devices 44 and 46 are secondary lasers 44 and 46, which are all contained within the housing 40. The vertical movement device 50 and the horizontal movement device 48 move the housing vertically and horizontally to align the primary laser 42 with a physical face center point of a golf club, golf club head or face component. A knob 52 allows an operator to adjust the horizontal position of the primary laser 42 relative to the base plate assembly 28, and a knob 54 allows an operator to adjust the vertical position of the primary laser 42 relative to the base plate assembly 28.

A preferred laser system is an OPTONCDT 1400 series system available from MICRO-EPSILON. A laser optical displacement Sensor uses the principal of optical triangulation, implementing a visible, modulated point of light that is projected onto the target surface. Depending on the distance to the target surface, the diffused fraction of the reflection of this point of light is then focused onto a position sensitive array of sensors by a receiving lens. The receiving lens and sensors are arranged at a certain angle with respect to the optical axis of the laser beam. A self contained controller calculates the measured distance value, and is derived by the triangulated relationship between the laser emitter point, the target point, and the receiving lens. The preferred laser is a class 2 red (670 nanometers) laser having a 1 milliwatt semiconductor source, with a range of 20 millimeters. However, those skilled in the pertinent art will recognize that other noncontact displacement measuring sensors may be used with the present invention.

Figure 3:
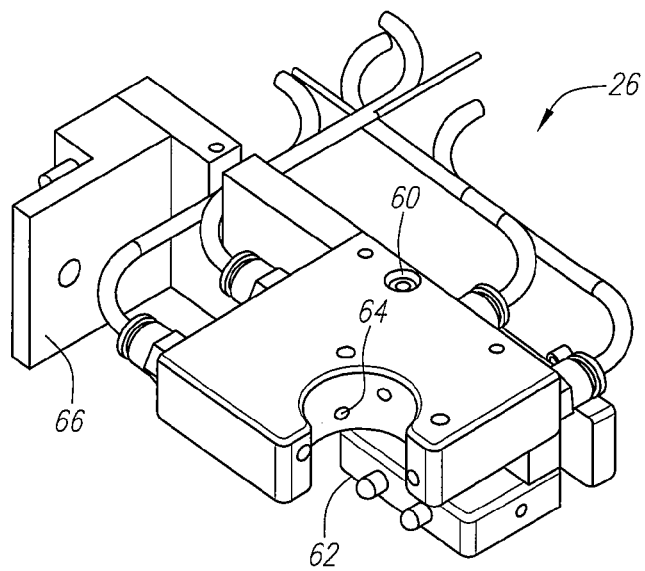
FIG. 3 is an isolated perspective view of the shaft-center sensor assembly of the apparatus of FIG. 1.

As shown in FIG. 3, the shaft center sensor assembly 26 generally comprises a sensor device 60, an aperture 62 for placement of a shaft therein, sensor ports 64 and a bracket 66. A preferred sensor device 60 is a FU-18 fiberoptic sensor from KEYENCE, which is a thrubeam device with a red LED detector having a maximum detecting distance of 1300 millimeters.

Figure 4:
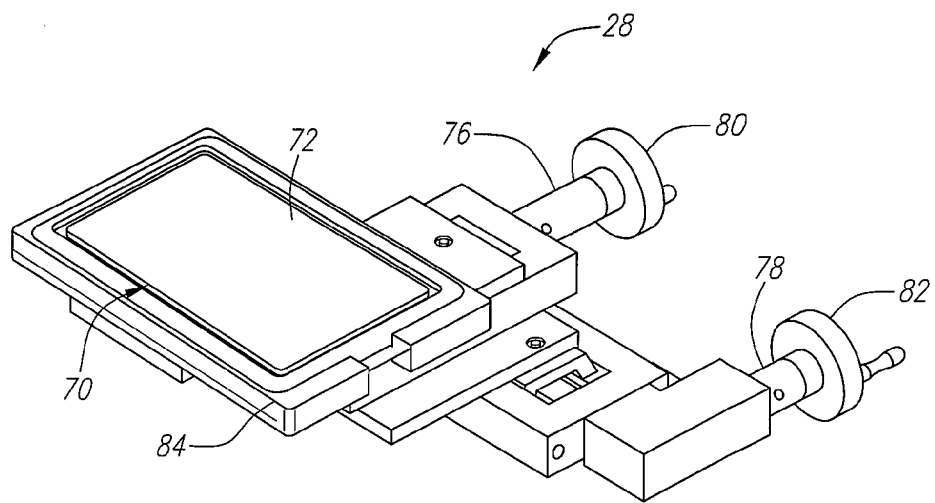
FIG. 4 is an isolated perspective view of the base plate assembly of the apparatus of FIG. 1.

As shown in FIG. 4, the base plate assembly 28 generally comprises a base plate 70 having a smooth surface 72 and a tacky surface 74 (not shown), a forward-rearward movement device 76, a lateral movement device 78 and a frame 84 for holding the base plate 70. A knob 80 allows an operator to adjust the forward or rearward position of the base plate 70, and a knob 82 allows an operator to adjust the lateral movement of the base plate 70. The tacky surface 74 is used for measuring the face angle of a golf club, and the smooth surface 72 is used for measuring the face angle of a golf club head or face component.

Figure 5:
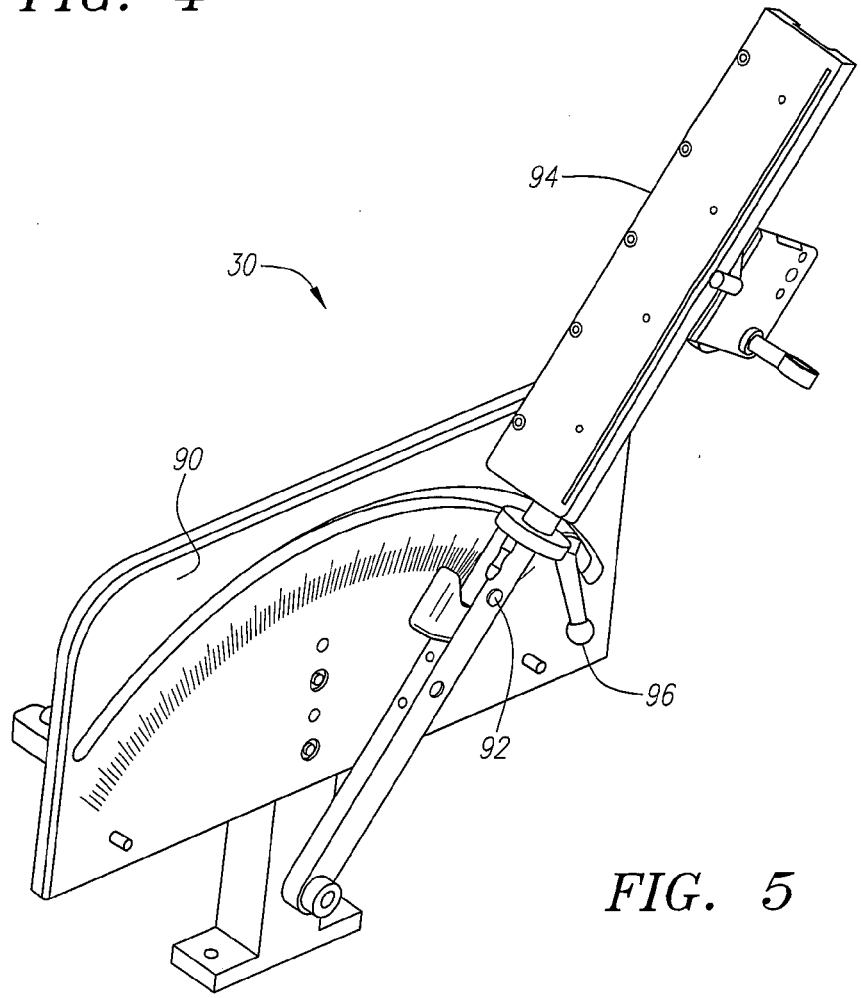
FIG. 5 is an isolated perspective view of the lie adjustment assembly of the apparatus of FIG. 1.

As shown in FIG. 5, the lie adjustment assembly 30 generally comprises a lie scale plate 90, an arm 92, a guide support plate 94 and an adjustment handle 96. The lie adjustment assembly 30 allows the operator to set the golf club at its designated lie angle. As shown in FIG. 5, the arm 92 and guide support plate 94 are positioned for a right-handed golf club, golf club head or face component. The arm 92 and guide support plate 94 would be switched to the opposite side of the lie scale plate 90 in order to measure the face angle of a left-handed golf club, golf club head or face component.

Figure 6:
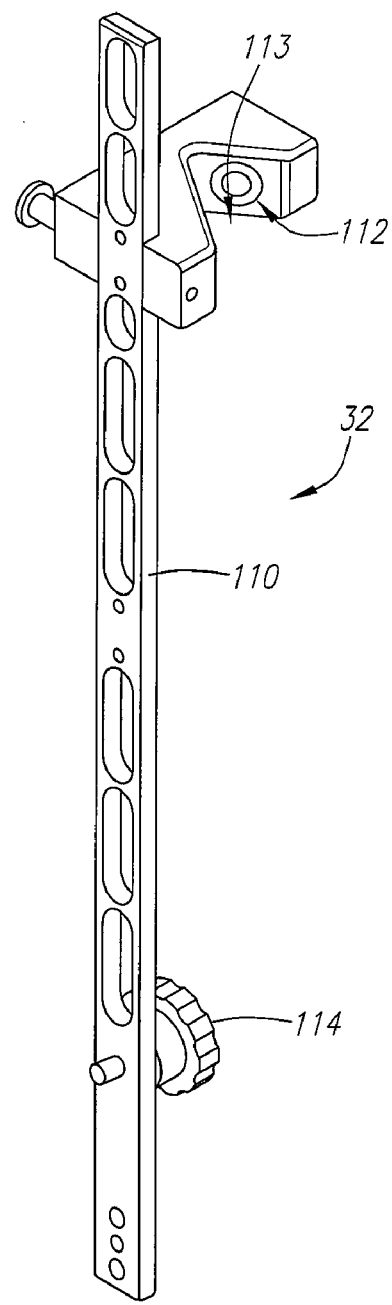
FIG. 6 is an isolated perspective view of the shaft support assembly of the apparatus of FIG. 1.

As shown in FIG. 6, the shaft support assembly 32 generally comprises a shaft support arm 110, a V-block shaft support device 112 with a V-aperture 113 and an attachment knob 114. The shaft support assembly 32 is attached to the guide support plate 94 of the lie adjustment assembly 30. The butt end of a shaft is positioned within the V-aperture 113 of the V-block shaft support 112, approximately 5 inches from the top of a grip of the golf club.

Figure 7:
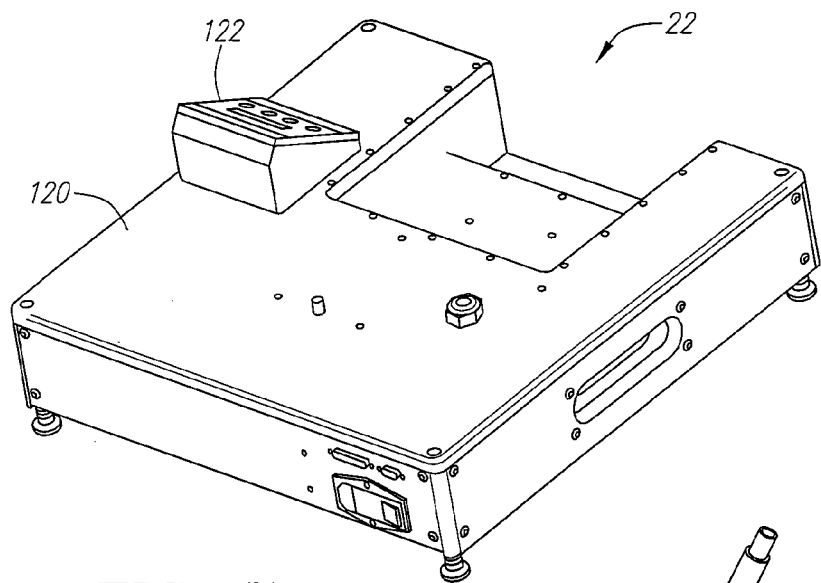
FIG. 7 is an isolated perspective view of the base assembly of the apparatus of FIG. 1.

As shown in FIG. 7, the base 22 generally comprises a housing 120 and a operator interface terminal 122. A preferred operator interface terminal 122 is a E-50 terminal available from Mistubishi Electric. The apparatus 20 is controlled by a programmable logic controller placed within the base 22. The apparatus 20 is powered by alternating current.

Figure 8:
FIG. 8 is an isolated perspective view of a calibrating tool.

As shown in FIG. 8, a calibrating tool 200 comprises a club head 202 and a shaft 204. The calibrating tool 200 has a zero degree face angle, and is used to calibrate the apparatus before measuring the face angle of a golf club, golf club head or face component.

Figure 9:
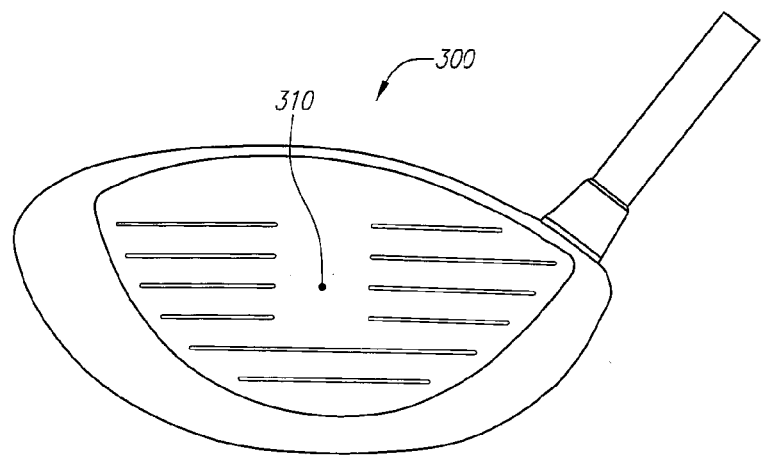
FIG. 9 is a front view of a golf club.
Figure 10:
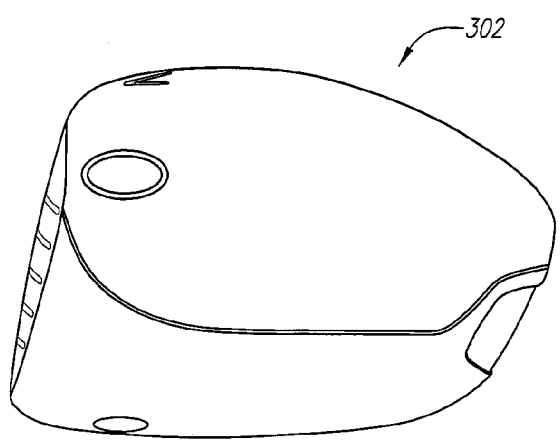
FIG. 10 is a heel-side view of a golf club head.
Figure 11:
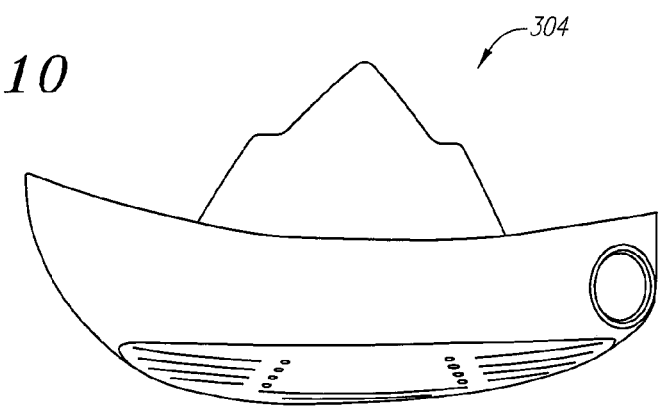
FIG. 11 is a top perspective view of a face component for a golf club head.

An example of a golf club 300 is shown in FIG. 9. An example of a golf club head 302 is shown in FIG. 10. An example of a face component 304 for a golf club head is shown in FIG. 11, and such face components are described in U.S. Pat. No. 6,582,323. As shown in FIG. 9, a face center point is designated 310. The face center point 310 is the geo-centric point of the face. In a preferred embodiment, the primary laser 42 is directed at the face center point 310 to allow for the secondary lasers 44 and 46 to determine the face angle of the golf club, golf club head, or face component. The mandrel 29 is used for measuring the face angle of golf club heads 302 and face components 304. The mandrel 29 preferably has a mass of approximately 88 grams.

Figure 12:
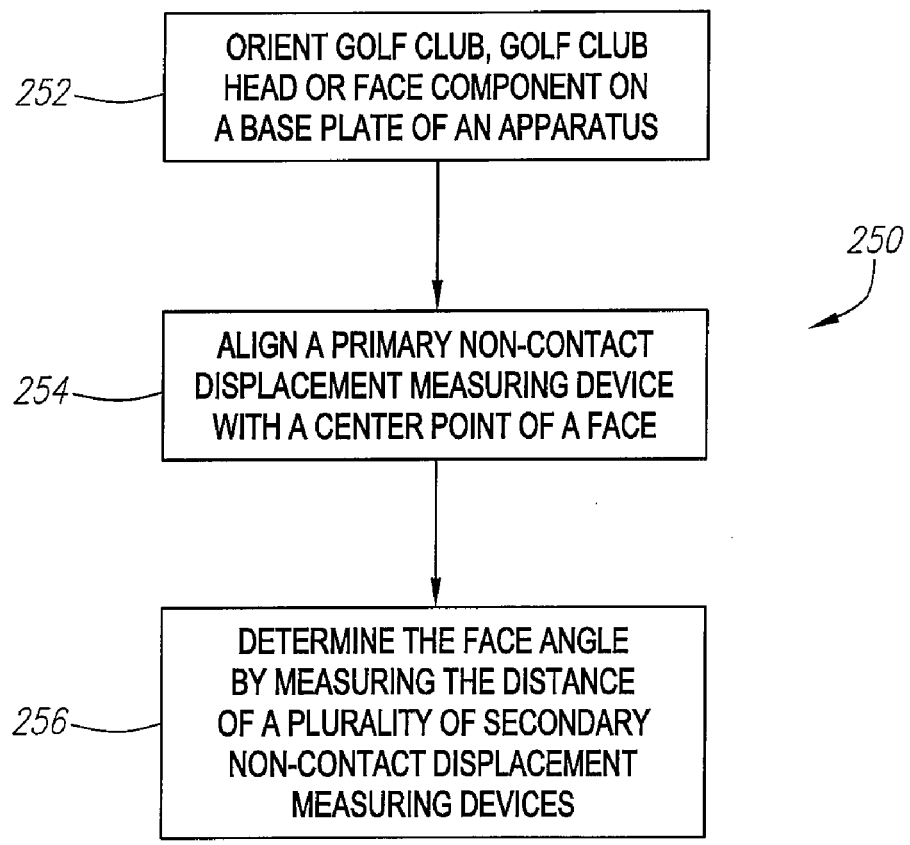
FIG. 12 is a flow chart of a general method of measuring a face angle.

A general method 250 for measuring the face angle of a golf club, golf club head or face component is shown in FIG. 12. First, at block 252, the golf club, golf club head or face component is oriented on the base plate 70 of the base plate assembly 28 of the apparatus 20. Orienting comprises simulating a center of gravity equilibrium status for the golf club when held by a typical golfer with the sole of the club head resting on a level surface. As such, a golfer typically grasps the golf club five inches from the top of the grip, and orienting attempts to position the golf club, golf club head or face component in a similar orientation on the base plate 70.

Next, at block 254, a face center locating device 42 is aligned with a face center point 310 of the golf club, golf club head or face component. In a preferred embodiment, a primary laser 42 is aligned with the face center point 310. The primary laser 42 is positioned by movement of the entire laser assembly 24 through use of the horizontal movement device 48 and/or vertical movement device 50.

Next, at block 256, the face angle of the golf club, golf club head or face component is determined by measuring the distance of a plurality of non-contact displacement measuring devices. In a preferred embodiment, lasers 44 and 46 are utilized to determine the face angle. The distance of laser 44 from its point of origin to the face is compared with the distance of laser 46 from its point of origin to the face. This measurement should not be taken on a scoreline since the depth of the scoreline would influence the results. If laser 44 is on the toe side of the face and laser 46 is on the heel side of the face, then if the distance of laser 44 is longer than the distance of laser 46 the face angle is open. Alternatively, if laser 44 is on the toe side of the face and laser 46 is on the heel side of the face, then if the distance of laser 44 is shorter than the distance of laser 46, the face angle is closed. Yet further, if the distance of laser 44 and the distance of laser 46 are equal, then the face angle is neutral or square.

Figure 13:
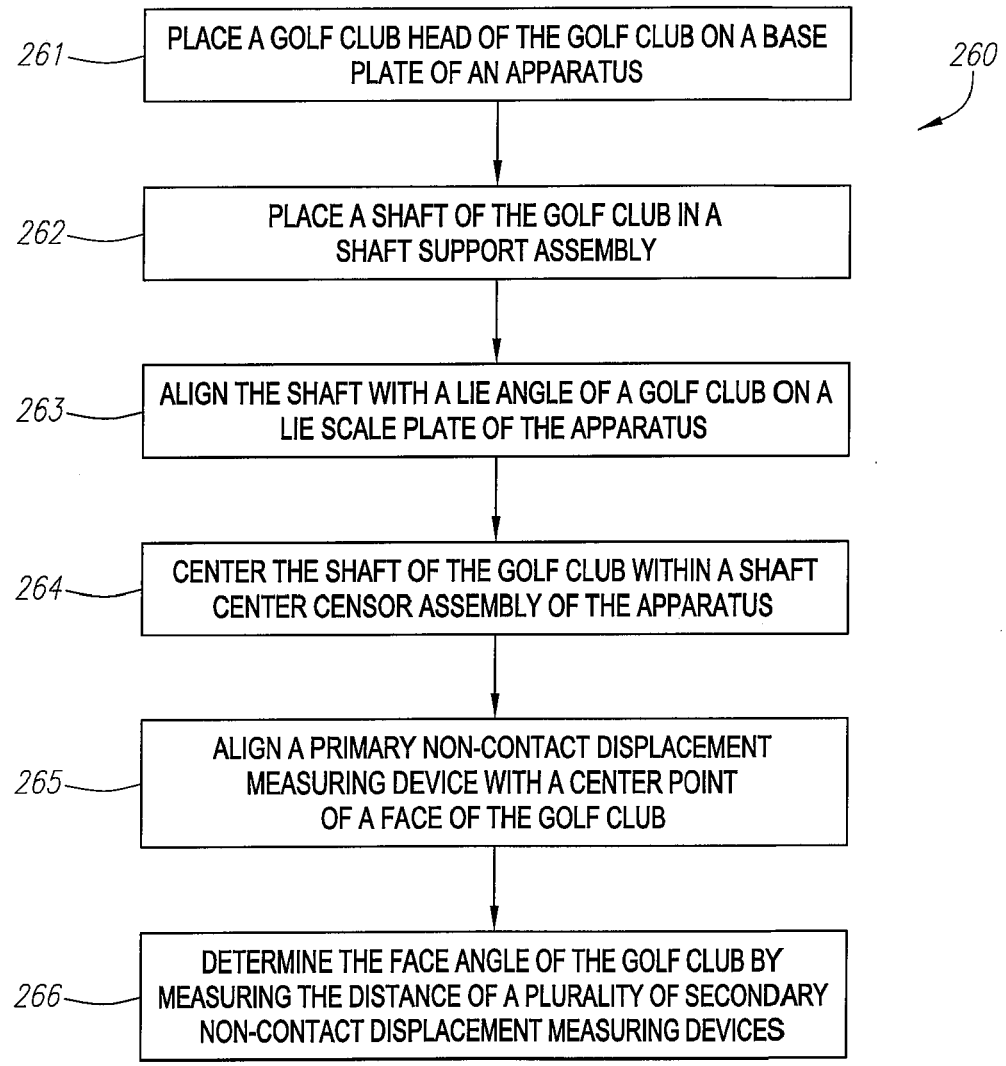
FIG. 13 is a flow chart of a specific method of measuring a face angle.

A more specific method 260 for measuring the face angle of a golf club is illustrated in FIG. 13. At block 261, a golf club head of the golf club is placed on the base plate 70 of the base plate assembly 28 of the apparatus 20. For a golf club, the tacky surface 74 of the base plate 70 is used to maintain the golf club in a fixed position. Alternatively, the smooth surface 72 of the base plate 70 should be used for a golf club head or face component.

At block 262, the shaft of the golf club is placed within the shaft support assembly 32. Specifically, the shaft is placed within the V-aperture 113 of the V-block shaft support 112. The portion of the shaft resting within the V-aperture should be approximately five inches from the top of the golf club.

Next, at block 263, the shaft is aligned with the lie angle of golf club on the lie scale plate 90 of the lie adjustment assembly 30. If the golf club has a fifty-eight degrees lie angle, then the lie adjustment assembly 30 is set at fiftyeight degrees on the lie scale plate 90. The lie scale plate 90 preferably has a scale that ranges from thirty degrees to ninety degrees on its right hand side and thirty degrees to ninety degrees on its left-hand side. The lie adjustment assembly 30 is adjusted for left-hand and right hand golf clubs.

At block 264, the shaft is centered within the aperture 62 of the sensor device 60 of the shaft center sensor assembly 26 of the apparatus 20. The shaft is centered by maneuvering the base plate assembly 28 through use of the forward-rearward movement device 76 and the lateral movement device 78.

Next, at block 265, a face center locating device 42 is aligned with a face center point 310 of the golf club. In a preferred embodiment, a primary laser 42 is aligned with the face center point 310. The primary laser 42 is positioned by movement of the entire laser assembly 24 through use of the horizontal movement device 48 and/or vertical movement device 50.

Figure 14:
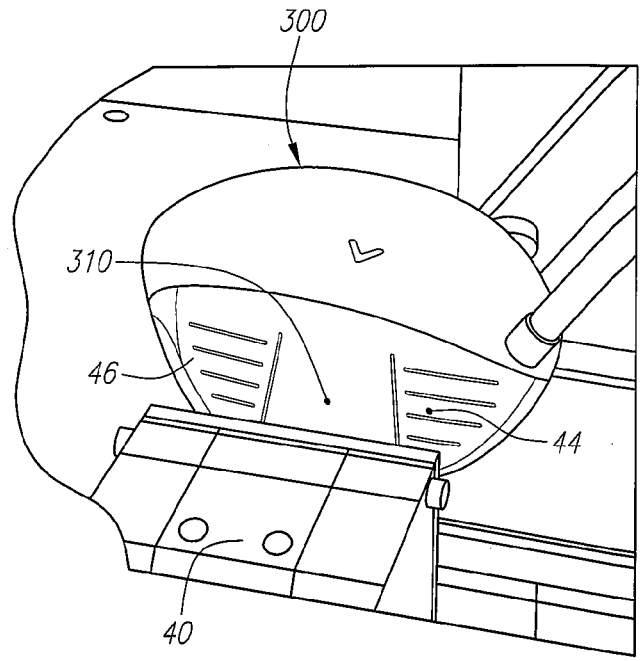
FIG. 14 is a perspective view of a golf club within the apparatus and positioned in front of a non-contact displacement measuring assembly.
Figure 15:
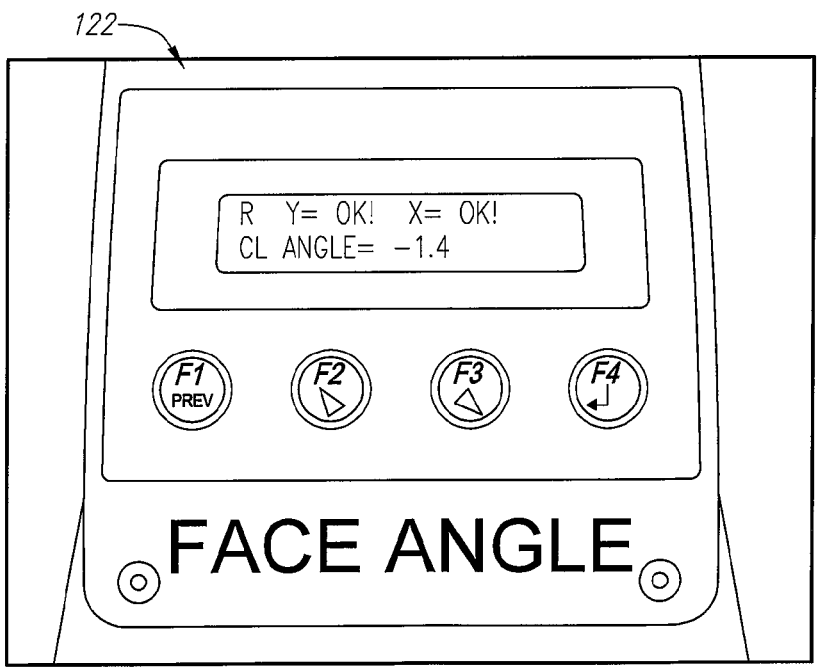
FIG. 15 is a isolated view of an operator interface terminal of the apparatus.

Next, at block 266, the face angle of the golf club is determined by measuring the distance of a plurality of noncontact displacement measuring devices. In a preferred embodiment, lasers 44 and 46 are utilized to determine the face angle, as shown in FIG. 14. The distance of laser 44 from its point of origin to the face is compared with the distance of laser 46 from its point of origin to the face. If laser 44 is on the toe side of the face and laser 46 is on the heel side of the face, then if the distance of laser 44 is longer than the distance of laser 46 the face angle is open. Alternatively, if laser 44 is on the toe side of the face and laser 46 is on the heel side of the face, then if the distance of laser 44 is short than the distance of laser 46, the face angle is closed. Yet further, if the distance of laser 44 and the distance of laser 46 are equal, then the face angle is neutral or square. The face angle will be displayed on the operator interface terminal 122, as shown in FIG. 15.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. An apparatus for measuring the face angle of a golf club, a golf club head or a face component, the apparatus comprising:

a base;

a base plate assembly positioned on the base, the base plate assembly capable of X-Y movement relative to the base;

a non-contact displacement measuring assembly comprising a face center locating device, a plurality of non-contact displacement measuring devices, a vertical movement device and a horizontal movement device, the non-contact displacement measuring assembly positioned on the base forward of the base plate assembly;

a lie adjustment assembly positioned on the base rearward of the base plate assembly, the lie adjustment assembly comprising a lie scale plate, an arm and a guide support plate;

a shaft support assembly attached to the guide support plate of the lie adjustment assembly, the shaft support assembly comprising a shaft support arm and a shaft support device with an aperture;

a shaft center sensor assembly attached to the arm of the lie adjustment assembly above the base plate assembly; and, an operator interface terminal positioned on the base.

2. An apparatus for measuring the face angle of a golf club, a golf club head or a face component, the apparatus comprising:

a base;

a base plate assembly positioned on the base, the base plate assembly capable of X-Y movement relative to the base;

non-contact displacement means for measuring the face angle of the golf club, the golf club head or the face component, the non-contact displacement measuring means positioned on the base forward of the base plate assembly;

means for simulating the lie angle of the golf club, golf club head of face component, the simulating means positioned on the base rearward of the base plate assembly;

means for centering a shaft of the golf club or a mandrel of the golf club head or face component, the centering means positioned above the base plate assembly; and means for operator interface, the operator interface means positioned on the base.

* * * * *